United States Patent [19]

Huls

[11] Patent Number: 4,629,326
[45] Date of Patent: Dec. 16, 1986

[54] PIN-BARREL EXTRUDER HAVING ADJUSTABLE PINS

[75] Inventor: Felipe Huls, Pattensen, Fed. Rep. of Germany

[73] Assignee: Hermann Berstorff Maschinenbau GmbH, Hanover, Fed. Rep. of Germany

[21] Appl. No.: 754,158

[22] Filed: Jul. 12, 1985

[30] Foreign Application Priority Data

Feb. 23, 1985 [DE] Fed. Rep. of Germany ....... 3506424

[51] Int. Cl.[4] ........................... B29B 1/06; B01F 7/08
[52] U.S. Cl. ...................................... 366/80; 366/90; 366/307; 366/322
[58] Field of Search ................... 366/80, 90, 307, 322, 366/324; 100/150; 425/207, 208, 209

[56] References Cited

U.S. PATENT DOCUMENTS 3,169,752  2/1965  De Laubarede .................. 366/80
4,178,104  12/1979  Menges et al. .................. 366/80
4,462,691  7/1984  Boguslawski .................... 366/80
4,581,992  4/1986  Koch ............................... 366/90 X Primary Examiner—Philip R. Coe
Attorney, Agent, or Firm—Schwartz, Jeffery, Schwaab, Mack, Blumenthal & Evans

[57] ABSTRACT

A pin-barrel extruder of the type used for processing rubber or thermoplastics materials, for extracting liquids from liquid-solid mixtures and for pulping wood substances includes adjustment means which permit the depth of penetration of the pins, which project into the hollow barrel of an extruder, to be adjusted in a continuous manner. To achieve this, the pins are threadly located in throughbores provided in the barrel so that their radially outer ends project externally of the barrel. On the externally projecting end of each pin, a chain wheel or sprocket is provided which is driven by a chain drive. Actuation of the drive thus alters the depth of penetration of the pins in the barrel.

7 Claims, 6 Drawing Figures

PIN-BARREL EXTRUDER HAVING ADJUSTABLE PINS

FIELD OF THE INVENTION

The present invention relates to a pin-barrel extruder. More particularly, it relates to an extruder in which the pins are adjustable.

BACKGROUND OF THE INVENTION AND PRIOR ART DISCUSSION

Pin-barrel extruders are known and comprise a screw conveyor which is rotatable in the hollow interior of a barrel. Disposed along the length of the barrel and projecting radially into the hollow interior of the barrel are a plurality of pins. These pins project to adjacent the core of the screw, the flight or flights on the screw being discontinuous in the region of the pins.

It is desirable if the depth of penetration of the pins into the barrel is adjustable. Such an arrangement is disclosed in U.S. Pat. No. 4,178,104. In such arrangement the pins are screw-fitted in holding members and are non-rotatably connected thereto by means of lock nuts. The holding fixtures are radially displaceable in guide members mounted on the extruder cylinder. A gear member is used for adjustment purposes. One face of the gear faces the holding fixture and is provided with a cam track. The track engages corresponding complementary cam-followers on the holding fixtures. The gear member is driven by a pinion, is freely rotatable and is prevented from axial movement by a collar ring.

However, such an arrangement suffers from numerous disadvantages. In setting up such an arrangement, the gear member must firstly be positioned over the extruder barrel. In its end position, it then has to be mounted on a sleeve-like guide means which, in turn, has to be screw-connected to the extruder barrel. Finally, complementary cams and cam tracks have to be provided laterally on the gear member and in the holding fixtures. This is time-consuming and costly.

In addition, an extremely elaborate construction is also required, for the mounting of the drive pinion which engages with the gear on the extruder cylinder. This adds to the costs associated with the production of an extruder having such an adjustment arrangement.

It is also difficult to assemble the adjusting means. Before a barrel flange connecting member, which is usually provided to permit barrel portions to be connected together, is welded to one end of a barrel portion, it is necessary for the sleeve-like guide member to be slid onto the barrel so as to receive the bearings for the gear. The gear is then positioned over the cylinder and brought into its intended position. Only after this has been done can the guide member be screw-connected to the extruder barrel. The holding fixture, which is provided with the lateral cam followers, is then slid onto the extruder barrel into its intended position. The individual pins are screwed radially inwardly through the holding fixture. Only when the assembly of all of these integers has been completed, can the barrel flange be welded to the end of the barrel portion.

After a period of time, it is likely that the cam followers on the holding fixture and the cam track on the gear member will exhibit signs of wear. To replace them, the above-described procedure must be reversed. So much work is involved that it is simpler to replace the entire barrel portion. Moreover, it is also necessary to extract the screw from the extruder, and to remove the barrel flange connection. These measures which need to be taken mean that the extruder is inoperative for long, and therefore costly, periods of time.

OBJECTS OF THE INVENTION

It is an object of the present invention to provide a pin-barrel extruder in the pins which are adjustable but in which the adjusting means are of a very simple construction and require little assembly and dismantling. In particular, it is an object of the invention to avoid the necessity for extracting the screw of the extruder and for disconnecting, by removing the weld, the flanges of the individual barrel portions when it is desired to change or replace the means for adjusting the pins.

SUMMARY OF THE INVENTION

According to the present invention, there is provided a pin-barrel extruder suitable for processing rubber or thermoplastics materials, for removing liquids from liquid-solid mixtures and for pulping wood substances, comprising hollow cylindrical barrel means, said barrel means comprising a radially inner surface and a radially outer surface, screw means rotatable in said hollow cylindrical barrel means, said screw means comprising a core portion and at least one flight portion helically disposed around said core portion, said at least one flight portion being discontinuous, said barrel means defining radially directed throughbores extending from said radially outer surface to said radially inner surface, said throughbores being distributed both around the periphery of said barrel at substantially uniform intervals and in axially aligned rows along the length of said barrel, pin means disposed in said throughbores, said pin means including opposed first end and second end regions, said first end region of said pin means being directed radially inwardly towards the longitudinal axis of said core of said screw means and projecting into said hollow cylindrical barrel means to adjacent said core through said discontinuous portions of said at least one flight, and adjusting means for adjusting the depth of penetration of said pin means into said hollow cylindrical barrel means, wherein said adjusting means comprises sprocket or chain wheel means non-rotatably mounted on said second end region of said pin means and wherein each said pin means includes a threaded portion threadably locatable in said barrel, said adjusting means further including at least one chain drive means driving at least two of said chain wheels or sprockets so as to cause rotation of said pins thereby causing adjustment of the depth of penetration of said pins into said barrel.

By disposing sprockets or chain wheels non-rotatably on the radially outer ends of the pins where they project externally of the hollow cylinder and by making the pins threadably locatable in the throughbores in the barrel, the depth of penetration of the pins into the barrel can be varied, as desired, simply by rotating the chain wheels. Obviously if the sprockets or chain wheels are rotated in one direction, the depth of penetration of the pins into the barrel will be increased whilst rotation of the sprockets or chain wheels in the opposite direction will cause the depth of penetration to be decreased. If such rotation is continued, the ultimate result is the total withdrawal of the pins from the barrel.

The desired degree of homogenisation of the material, temperature constrictions imposed by the material being treated and the desired out put of the extruder are all factors which need to be taken into account when determining the depth of penetration of the pins into the barrel. The present invention provides an arrangement in which such penetration can be altered, depending upon these factors, both simply and smooth over a wide range instread of in a step-wise manner.

Preferably, each said chain drive means comprises drive means, at least one sprocket or chain wheel driven by said drive means and an endless chain passing around said driven chain wheel and at least one chain wheel or sprocket carried by said pins.

Desirably, each said chain drive means drives one of said axially aligned row of pins extending parallel to said longitudinal axis of said barrel and wherein guide frame means surround each said endless chain, said extruder further including tensioning members mounted in said guide frame for tensioning said endless chain, said tensioning members having a semi-circular outline. The drive may be located either centrally or laterally of a chain wheel and the drive member may have an abutment on the barrel itself.

The endless chain may be disposed in a guide frame provided with tensioning members. This simultaneously protects the chain and minimizes the possibility of accidents.

In one embodiment, one said endless chain passes around all of said pins provided on said barrel portion, and wherein said chain drive means further includes guiding and tensioning roller means disposed between adjacent said aligned rows of pins extending parallel to said longitudinal axis of said barrel wherein said chain passes around a driven chain wheel or sprocket and then at least once along said chain wheels or sprockets of a first of said rows, circumferentially around said barrel around said guiding and tensional roller means to a first chain wheel or sprocket on a first said pin adjacent one of said rows and along said adjacent row, said circumferential guidance and travel along said further row continuing until said chain returns to said driven chain wheel or sprocket. This is a particularly advantageous embodiment because only one endless chain and either one drive member or a plurality of synchronously connected drive members, are required to adjust the depth of penetration of all of the pins provided on a portion of the barrel. Since there may be as many as 48 pins, for example, on a barrel portion the advantage of this arrangement will be readily apparent because, on occasion, these pins need to be removed so as to permit the extruded screw to be replaced or cleaned. Hitherto, each pin has had to be removed separately using a wrenching tool and such an operation is, of course, extremely time-consuming.

BRIEF DESCRIPTION OF THE DRAWINGS

Two embodiments of a pin-barrel extruder in accordance with the present invention will be further described, by way of example, with reference to the accompanying drawings, in which.

DESCRIPTION OF PREFERRED EMBODIMENTS

Figure 1:
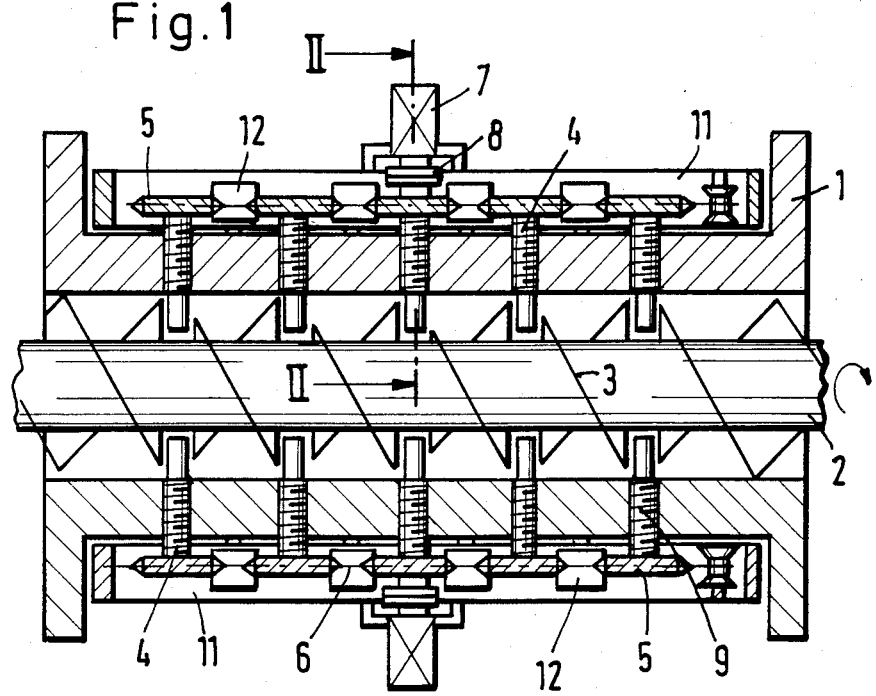
FIG. 1 is a schematic, longitudinal sectional view through one embodiment of a pin-barrel extruder in accordance with the present invention.
Figure 4:
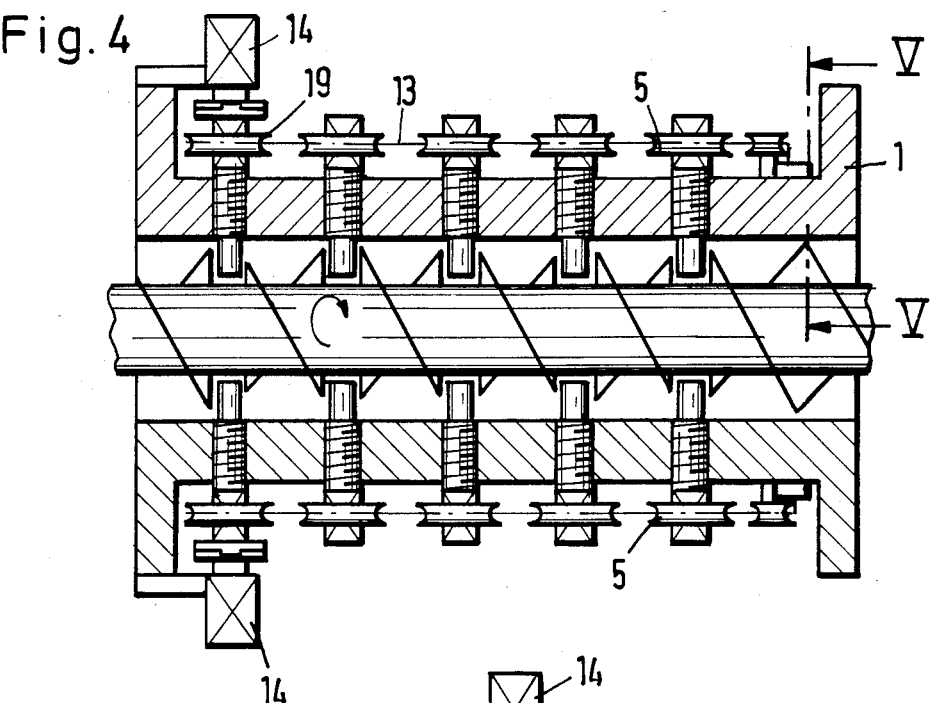
FIG. 4 is a schematic, longitudinal sectional view through an alternative embodiment of a pin-barrel extruder in accordance with the present invention.

In FIGS. 1 and 4, there is shown a barrel portion 1 of a pin-barrel extruder. In the hollow interior of the portion 1, a screw 2 is rotatably mounted. The screw comprises a central core and one or more screw flights 3 which are helically disposed around the periphery of the core. The flight or flights 3 are discontinuous so as to permit pins 4 to project radially inwardly through the walls of the portion to adjacent the screw core past the discontinuous or missing parts of the flight or flights. These pins 4 are disposed both at regular intervals around the periphery of the barrel 1 and in aligned rows extending parallel to the longitudinal axis of the barrel 1. On the radially outer ends of each pin 4, that is to say, radially outwardly of the barrel 3, a chain wheel or sprocket 5 is mounted.

Figure 2:
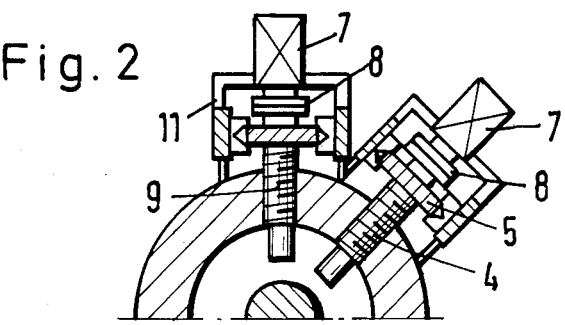
FIG. 2 is a partial, cross-sectional view taken along the line II—II of FIG. 1.
Figure 3:
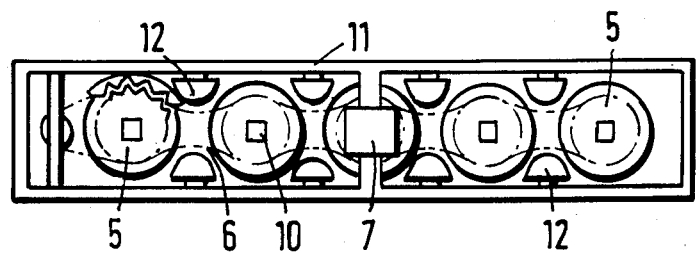
FIG. 3 is a plan view of a part of the extruder shown in FIG. 1.

In the embodiment shown in FIGS. 1 to 3, an endless chain 6 rotates around all of the chain wheels or sprockets 5 mounted on the pins in one of the rows thereof extending parallel to the axis of the barrel 1. The chain 6 is driven by means of a motor 7 through the intermediary of a clutch member 8. Actuation of the motor 7 obviously causes the chain wheels or sprockets 5 to rotate.

The chain wheels 5 are non-rotatably connected to the pins 4. This can be achieved by fixedly connecting the chain wheels or, as shown in FIG. 3, by providing each pin with, for example, a square section or fitting which passes through a correspondingly shaped aperture in the chain wheel 5. In this case, the pin 4 can, obviously, slide through the aperture. If, in addition, each pin 4 is provided with a threaded portion which engages in a threaded member 9 fitted in the barrel 1 or forming part of the barrel 1, it will be evident that rotation of the chain wheel will cause axial movement of the pin. Thus rotation of the chain 6 in a first direction will cause the depth of penetration of the pin 4 into the barrel to be increased and rotation in the opposite direction will cause the depth of penetration to be decreased or even, if desired, cause the pins to be extracted completely from the barrel 1. Since the chain 6 passes around all of the pins 4 in a row, all of the pins 4 in that row will be displaced simultaneously.

In the arrangement shown in FIGS. 1 to 3, the chain drive 7,8 for each row of pins 4 is disposed in a guide frame 11. The frame 11 accommodates substantially semi-circular tensioning members 12 which are used for tensioning the endless chain 6.

The chain 6 is thus both accurately guided and protected by the guide frame 11. In addition, the risk of accidents is reduced. The tensioning members 12 ensure that the angle at which the endless chain 6 is fed to and leaves each sprocket 5 is increased which improves the power transmission characteristics.

Figure 5:
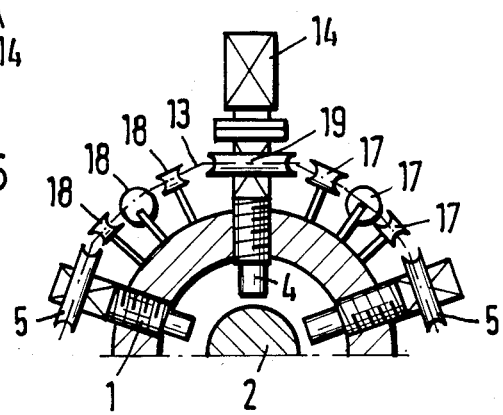
FIG. 5 is a partial, cross-sectional view taken along the line V—V of FIG. 4.
Figure 6:
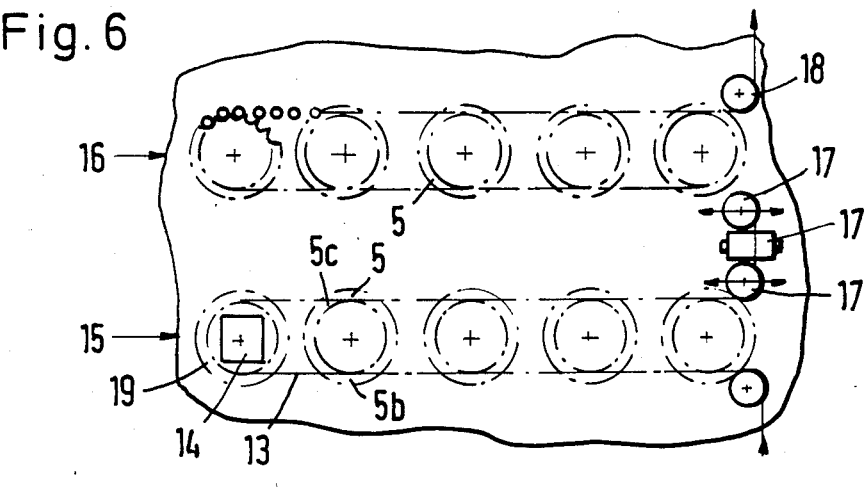
FIG. 6 is a plan view of a development of a portion of the extruder shown in FIG. 4.

The arrangement shown in FIGS. 4 to 6 is basically similar to that shown in FIGS. 1 to 3, with the exception that, instead of one endless chain being provided for each row of pins 4, one endless chain 13, driven by one or more motors 14, is used for adjusting all of the pins 4.

The endless chain 13 passes along one row of pins, for example, the row 15 shown in FIG. 6, so as to engage the sprockets 5. It is then guided around the last chain wheel or sprocket 19 of the row 15 and returns along the other side of the chain wheels. Each subsequent sprocket or chain wheel 5 in this row 15 is thus engaged in diametrically opposed regions 5b and 5c by the chain 13.

After passing the first roller in row 15, the chain 13 is then guided over rollers 17 which maintains the tension thereof and also causes the chain 13 to pass circumferentially around the periphery of the hollow barrel 1 until it reaches the first sprocket or chain wheel 5 of an adjacent row of pins 16.

Once the endless chain 13 has also passed around this row of pins 4, that is to say, it has passed the sprockets or chain wheels 5 of the row of pins 16 in both directions, further circumferential guidance is effected through the intermediary of further tensioning and guide rollers 18 until the chain reaches the next row of pins. Thus continues until all of the chain wheels or sprockets 5 of all of the rows of pins disposed around the hollow cylinder 1 have been engaged by the chain and the endless chain 13 has returned to its starting point in the region of the drive member 14.

The advantage of this type of arrangement is that one drive member, or a plurality of synchronously connected drive members can be used to unscrew all of the pins provided on a portion of an extruder barrel simultaneously. This is an obvious advantage if, for example, the screw 2 needs to be replaced or cleaned.

I claim:

1. A pin-barrel extruder suitable for processing rubber, or thermoplastics materials, for removing liquids from liquid-solid mixtures and for pulping wood substances, comprising hollow cylindrical barrel means, said barrel means comprising a radially inner surface and a radially outer surface, screw means rotatable in said hollow cylindrical barrel means, said screw means comprising a core portion and at least one flight portion helically disposed around said core portion, said at least one flight portion being discontinuous, said barrel means defining radially directed throughbores extending from said radially outer surface to said radially inner surface, said throughbores being distributed both around the periphery of said barrel at substantially uniform intervals and in axially aligned rows along the length of said barrel, pin means disposed in said throughbores, said pin means including opposed first and second end regions, said first end region of said pin means being directed radially inwardly towards the longitudinal axis of said core of said screw means and projecting into said hollow cylindrical barrel means to adjacent said core through said discontinuous portions of said at least one flight, and adjusting means for adjusting the depth of penetration of said pin means into said hollow cylindrical barrel means, wherein said adjusting means comprises sprocket or chain wheel means non-rotatably mounted on said second end region of said pin means and wherein each said pin means includes a threaded portion threadably locatable in said barrel, said adjusting means further including at least one chain drive means driving at least two of said chain wheels or sprockets so as to cause rotation of said pins thereby causing adjustment of the depth of penetration of said pins into said barrel.

2. A pin-barrel extruder as recited in claim 1, wherein said chain wheels or sprockets are axially displaceable and non-rotatable relative to the longitudinal axis of said pins.

3. A pin-barrel extruder as recited in claim 1, wherein each said chain drive means comprises drive means, at least one sprocket or chain wheel driven by said drive means and an endless chain passing around said driven chain wheel and at least one chain wheel or sprocket carried by said pins.

4. A pin-barrel extruder as recited in claim 3, wherein each said chain drive means drives one of said axially aligned row of pins extending parallel to said longitudinal axis of said barrel and wherein guide frame means surround each said endless chain, said extruder further including tensioning members mounted in said guide frame for tensioning said endless chain, said tensioning members having a semi-circular outline.

5. A pin-barrel extruder as recited in claim 3, wherein one said endless chain passes around all of said pins provided on said barrel portion, and wherein said chain drive means further includes guiding and tensioning roller means disposed between adjacent said aligned rows of pins extending parallel to said longitudinal axis of said barrel wherein said chain passes around a driven chain wheel or sprocket and then at least once along said chain wheels or sprockets of a first of said rows, circumferentially around said barrel around said guiding and tensional roller means to a first chain wheel or sprocket on a first said pin adjacent one of said rows and along said adjacent row, said circumferential guidance and travel along said further row continuing until said chain returns to said driven chain wheel or sprocket.

6. A pin-barrel extruder as recited in claim 3 wherein a plurality of synchronously driven chain wheels or sprockets are provided.

7. A pin-barrel extruder as recited in claim 3, wherein each said chain wheels in each said row of pins is engaged, in two substantially diametrically opposed regions, by said endless chain.

* * * * *